United States Patent [19]

Hibino

[11] Patent Number: 4,495,854
[45] Date of Patent: Jan. 29, 1985

[54] POWER SERVO BOOSTER

[75] Inventor: Sadanobu Hibino, Saitama, Japan

[73] Assignee: Jidosha Kiki Co., Ltd., Tokyo, Japan

[21] Appl. No.: 444,916

[22] Filed: Nov. 29, 1982

Related U.S. Application Data

[63] Continuation of Ser. No. 153,294, May 27, 1980, abandoned.

[30] Foreign Application Priority Data

Jul. 11, 1979 [JP] Japan ............................... 54-87589

[51] Int. Cl.³ .............................................. F01B 19/00
[52] U.S. Cl. ......................................... 91/438; 92/99;
92/48
[58] Field of Search ................... 92/98 D, 99, 101, 48;
74/18.2; 91/438

[56] References Cited

U.S. PATENT DOCUMENTS

| | | | |
|---|---|---|---|
| 3,082,745 | 3/1963 | Brooks | 121/41 |
| 3,136,229 | 6/1964 | Bauman | 92/99 |
| 3,528,301 | 9/1970 | Wasmer | 74/18.2 |
| 3,577,832 | 5/1971 | Parsons | 92/98 D |
| 3,760,693 | 9/1973 | Myers | 92/99 |
| 3,799,008 | 3/1974 | Danek | 92/99 |
| 3,868,890 | 3/1975 | Roberts | 92/5 R |
| 3,958,497 | 5/1976 | Gardner | 92/99 |
| 4,043,251 | 8/1977 | Ohmi | 92/98 D |
| 4,257,312 | 3/1981 | Ohmi | 92/99 |
| 4,270,353 | 6/1981 | Thomas | 92/98 D |
| 4,270,438 | 6/1981 | Thomas | 92/98 D |
| 4,292,887 | 10/1981 | Ohta | 92/99 |

FOREIGN PATENT DOCUMENTS

| | | | |
|---|---|---|---|
| 60869 | 4/1975 | Australia | 92/98 D |
| 49-31107 | 8/1974 | Japan . | |

*Primary Examiner*—Abraham Hershkovitz
*Attorney, Agent, or Firm*—Sughrue, Mion, Zinn, Macpeak & Seas

[57] ABSTRACT

A power servo booster in which the diaphragms are freely pivotable from the power piston so as to prevent folding and collapse of the diaphragms in the non-powered state. A shell of the booster is divided into two volumes with a power piston and diaphragm in each volume dividing the corresponding volume into chambers at a negative pressure and at atmospheric pressure. The inner peripheral ends of the two diaphragms are fitted into grooves formed on the sides of the pistons in such a manner as to be freely rotatable or pivotable thereby preventing folding of the diaphragms.

2 Claims, 5 Drawing Figures

POWER SERVO BOOSTER

This is a continuation of application Ser. No. 153,294 filed May 27, 1980, now abandoned.

BACKGROUND OF THE INVENTION

The present invention relates to a power servo booster particularly one of the fluid differential pressure actuated type having two power pistons connected in series. Even more particularly, the invention relates to such a power servo booster in which the diaphragms thereof are prevented from being folded to provide surface contact in a return stroke of a power piston during the non-operative state of the booster.

A conventional power servo booster is shown in FIGS. 1 through 3 in which a power piston 1 is slidingly disposed within a shell 5 and a diaphragm 2 is secured to divide an internal space of the shell 5 into a negative pressure chamber 3 and an atmospheric pressure chamber 4. In the non-operative state of the booster in which a negative pressure is introduced to the negative pressure chamber 3 through a connecting tube 6, negative pressure is also introduced into the atmospheric pressure chamber 4 from the negative pressure chamber 3 through a valve device (not shown) disposed in the power piston 1. The position of the power piston is maintained as shown by a return spring 7. Upon urging or axial displacement of an input shaft 8 so as to cause fluid communication between the negative pressure chamber 3 and the atmospheric pressure chamber 4 to be blocked, atmospheric pressure is introduced into the chamber 4 to provide a pressure differential between the chambers 3 and 4 to thus create a force on the power piston 1 which in turn displaces a push rod 9 along the axial direction thereof.

When no negative pressure is present in the negative pressure chamber 3 such as during periods of air discharge in the brake lines, the internal pressure of the negative pressure chamber 3 becomes relatively larger than that of the atmospheric pressure chamber even if these chambers were both in communication with the atmosphere because of changes in relative volumes in the two chambers due to movement of the input shaft 8. As a result, a disc portion 2a of the diaphragm 2 is urged rearwardly in spite of the forward movement of the power piston 1 so that the diaphragm 2 becomes spaced apart from the power piston 1 and is urged toward its original non-powered position. In this case, as shown in FIG. 2, a peripheral end of a disc portion 1a of the power piston 1 extends beyond a folded portion 2b of the diaphragm 2 and the folded portion 2b is inclined radially inwardly as shown by an arrow. When the power piston 1 is restored to its original position, with such a deformation of the diaphragm maintained, portions of the diaphragm 2 may be disadvantageously folded over one another as shown in FIG. 3.

Such diaphragm folding or collapsing is most apt to occur in a power servo booster in which volume changes of the chambers are relatively large with respect to the stroke length of the power piston, particularly in a tandem type power servo booster provided with two negative pressure chambers in fluid communication with each other and two atmospheric chambers in fluid communication with each other.

The inventor of the present application has found that such collapsing of the folded diaphragm portion 2b in the direction shown by the arrow in FIG. 2 causes excessive bending at the boundary portion A of the diaphragm between an inner peripheral end portion 2c and the disc portion 2a thereof. That is, in a conventional power-servo booster, the inner peripheral end 2c of the diaphragm is fixedly secured to an annular groove 1b formed in the power piston 1 so that the inner peripheral end 2c is not freely rotatable or pivotable or movable in any manner. Even if a minute clearance were to be provided between the inner peripheral end 2c and the annular groove 1b with the end 2c more easily engaged with the groove 1b, such a clearance would nontheless not allow the end 2c to be freely movable in the groove 1b. Therefore, the peripheral end of the disc portion 1a of the power piston 1 would still tend to extend beyond the folded portion 2b of the diaphragm so that the boundary portion A of the diaphragm would still tend to bend and be deformed as shown in FIG. 2 with the folded portion 2b urged radially inwardly due to the application of stress thereto.

SUMMARY OF THE INVENTION

It is therefore an object of the present invention to overcome the disadvantages and drawbacks of the prior art power servo booster and to provide an improved power servo booster in which collapse of the diaphragm is prevented.

These, as well as other objects of the invention, are met by a power servo booster including a shell, at least one power piston, and at least one diaphragm with the piston and diaphragm dividing the shell into at least one negative pressure chamber and at least atmospheric pressure chamber. An inner peripheral end of the diaphragm is constructed and an annular groove is provided on the piston in which the inner peripheral end of the diaphragm is disposed with the inner peripheral end of the diaphragm being pivotable with respect to the power piston.

In a preferred embodiment, the shell is divided into first and second volumes by a central partitioning plate. The first volume is, in turn, divided into a first negative pressure chamber and a first atmospheric pressure chamber by a first piston and first diaphragm while the second volume is similarly divided into a second negative pressure chamber and a second atmospheric pressure chamber by a second piston and second diaphragm. A supporting plate is attached to an inward side of the first piston having an outward peripheral portion which forms an annular groove into which the inner peripheral end of the first diaphragm is disposed. The inner peripheral end of the first diaphragm is made pivotable or rotatable within the first annular groove by providing it with a curved or arcuate surface disposed adjacent the surface of the first piston. Also, the outer peripheral end of the supporting plate is oriented radially outwardly at an angle of inclination of 10° to 45° with respect to the radial direction of the piston. A second annular groove is formed at one side of the second piston with the inner peripheral end of the second diaphragm rotatably disposed therein. The second diaphragm is also provided with an arcuate surface adjacent the surface of the second piston. Moreover, the groove formed at one side of the second piston is relatively shallow and the open end corner of the groove is arcuately formed.

DESCRIPTION OF THE PREFERRED EMBODIMENTS

Figure 5:
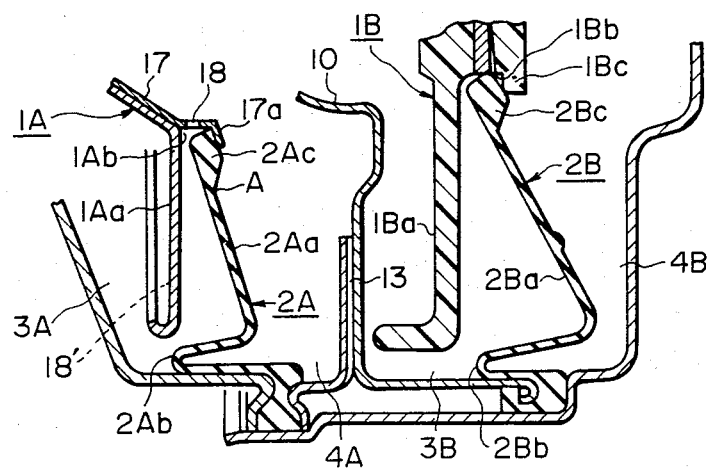
FIG. 5 is a cross-sectional view of essential parts of the tandem type power servo booster of FIG. 4 showing a different operational state from that shown in FIG. 4.
Figure 4:
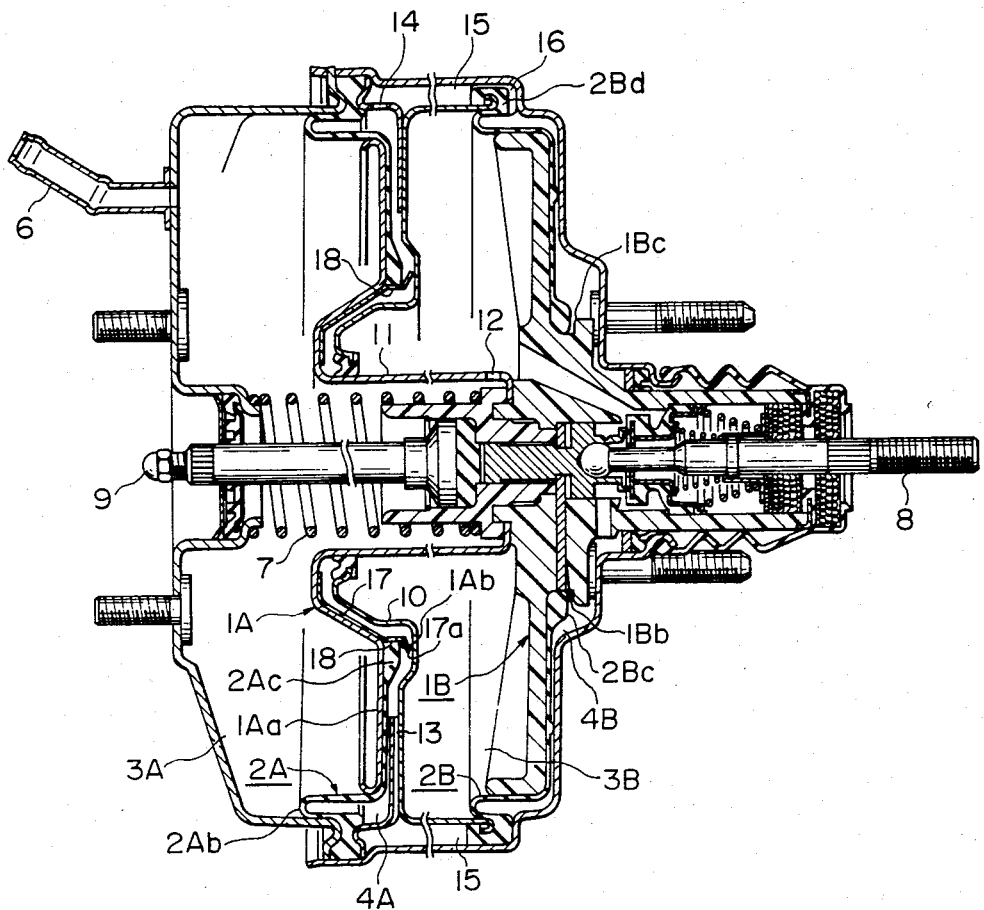
FIG. 4 is a cross-sectional view showing a tandem type power servo booster according to the present invention.

Referring now to FIGS. 4 and 5 of the drawings and initially to FIG. 4, a tandem type power servo booster constructed in accordance with the teachings of the present invention is illustrated. In this power servo booster, front and rear power pistons 1A, 1B are coaxially and slidably disposed within a casing 5 with front and rear diaphragms 2A, 2B secured to the power piston 1A, 1B, respectively. A partitioning plate 10 is disposed within the shell 5 dividing the shell 5 into two volumes. The front volume is divided by the front power piston 1A and a front diaphragm 2A into a first negative pressure chamber 3A and a first atmospheric pressure chamber 4A while the rear volume is divided by the rear power piston 1B and the rear diaphragm 2B into a second negative pressure chamber 3B and a second atmospheric pressure chamber 4B. The first negative pressure chamber 3A is in fluid communication with the second negative pressure chamber 3B through a cylindrical portion 11 formed at the axially central portion of the front power piston 1A and a hole 12 formed in the rear end of the cylindrical portion 11. First and second atmospheric pressure chambers 4A and 4B are in fluid communication with each other through a fluid passage 13 defined by the partitioning plate 10, a hole 14 formed in the plate 10, a passage 15 extending between the shell 5 and a sleeve portion of the partitioning plate 15, and a passage 16 formed at an outer peripheral end 2Bd of the rear diaphragm 2B. Reference numerals 6, 7, 8 and 9 designate a tube leading to a source of negative pressure, a return spring, an input shaft and a push rod, respectively. The construction thus far described is well-known in the art, the associated function and operation are the same as those of a conventional tandem type power servo booster, and therefore further description thereof is omitted.

The construction according to the present invention will now be described. According to the invention, a diaphragm supporting plate 17 is coupled to the rear surface of the front power piston 1A and is so shaped as to provide an annular groove 1Ab between the outer peripheral surface of the supporting plate 17 and an inner portion of a disc-shaped portion 1Aa of the power piston 1A. The groove 1Ab is adapted to support an inner peripheral end 2Ac of the front diaphragm 2A. An outer peripheral end 17a of the supporting plate 17 is oriented radially outwardly with a rearward inclination so that the axial width of the open end of the annular groove 1Ab is larger than that of the bottom portion thereof. The angle of inclination of the outer peripheral end 17a is preferably in the range of 10°–45° with respect to the radial direction of the power piston. The rear surface of the inner peripheral end 2c of the front diaphragm 2A, that is, the surface confronting the diaphragm supporting plate 17 is formed flat in the radial direction of the disc 1Aa of the front power piston 1A.

Further, a communication hole 18 is formed as shown in FIG. 5 at the bottom portion of the annular groove 1Ab provided by the supporting plate 17.

With this structure, when the input shaft 8 is displaced toward the left in the drawing without introducing negative pressure into the first negative pressure chamber 3A, a pressure differential is established between the first negative pressure chamber 3A and the first atmospheric pressure chamber 4A so that peripheral end portion of the disc 1Aa of the front power piston 1A extends past the folded portion 2Ab of the front diaphragm 2A as shown in FIG. 5. While this happens, the inner peripheral end 2Ac of the diaphragm 2A comes into contact with the outer peripheral end 17a of the supporting plate 17 due to the pressure differential. That is, the inner peripheral end 2Ac of the diaphragm 2A becomes freely pivotable within the annular groove 1Ab. As a result, bending is prevented at the boundary portion A between the disc portion 2Aa and the inner peripheral end 2Ac of the diaphragm. This in turn prevents the folded portion 2Ab from being urged radially inwardly thus avoiding disadvantageous collapse of the diaphragm. The communication hole 18 serves to permit air confined between the disc 1Aa of the power piston 1A and between the disc portion 2Aa of the diaphragm 2A to escape into the atmospheric pressure chamber 4A during the subsequent return stroke of the power piston 1A. In addition to this, during the forward movement of the power piston 1A, the communication hole 18 serves to communicate the negative pressure chamber 3A with the atmospheric pressure chamber 4A so that the pressure differential between the chambers 3A, 4A is reduced thus reducing the possibility of the folded portion 2Ab of the diaphragm 2A extending beyond the peripheral end of the disc 1Aa of the power piston 1A. During normal operation in which negative pressure is introduced to the negative pressure chamber 3A, fluid communication between the chambers 3A and 4A is blocked since the disc portion 2Aa of the diaphragm 2A is in tight surface engagement with the disc 1Aa of the power piston 1A because the pressure in the chamber 4A is higher than that in the chamber 3A. If desired, a second communication hole may be formed in the disc 1Aa of the power piston 1A at a location indicated by broken line 18' in FIG. 5 in order to permit air confined between the disc 1Aa and the disc portion 2Aa of the diaphragm 2A to escape into the negative pressure chamber 3A.

Figure 1:
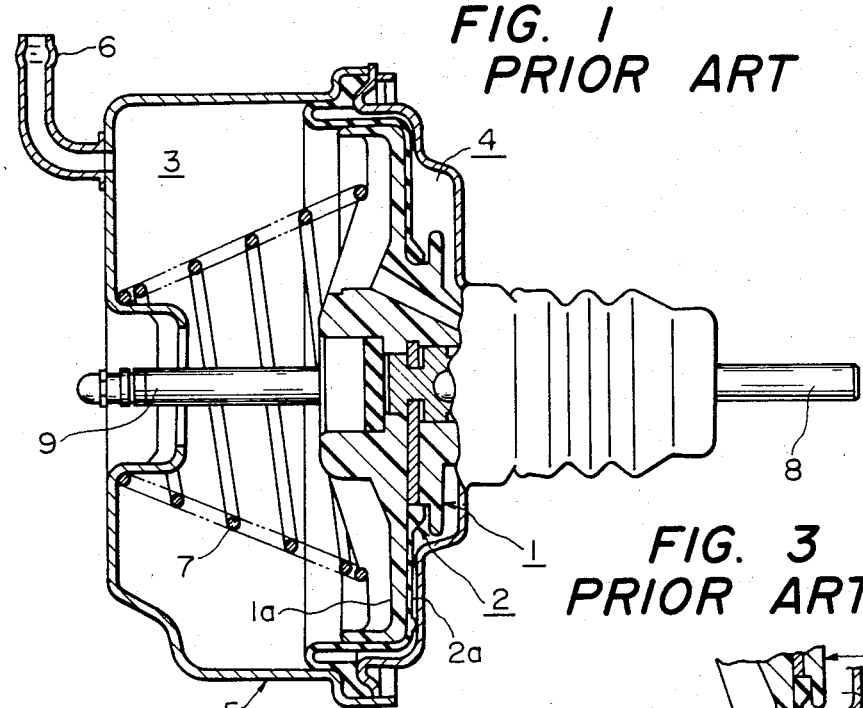
FIG. 1 is a cross-sectional view of a conventional power servo booster.
Figure 3:
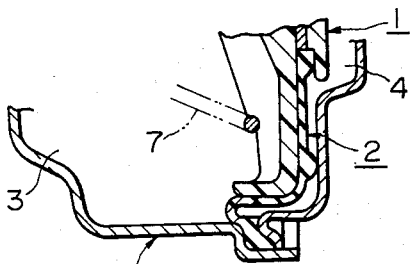
FIGS. 2 and 3 are cross-sectional views of essential parts of the conventional power servo booster showing different operational states.
Figure 2:
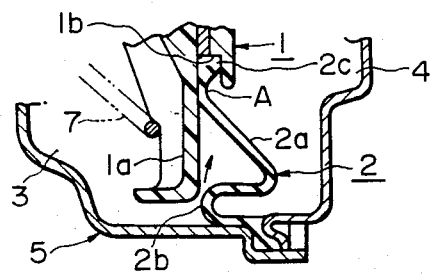

Next, the rear diaphragm 2B will be described. In FIG. 4, an annular groove 1Bb having a rectangular cross-section as in a conventional booster is provided in order to support an inner peripheral end 2Bc of the rear diaphragm 2B. However, in contrast to a conventionally formed annular groove, according to the present invention, the depth of the groove is reduced and the open end corner 1Bc of the groove 1Bb is arcuately formed. Further, the inner peripheral end 2Bc of the rear diaphragm 2B is arcuately formed so as to allow the inner peripheral end 2Bc to be freely pivotable within the annular groove 1Bb. Since the depth of the annular groove 1Bb is relatively small, the inner peripheral end 2Bc of the rear diaphragm 2B is easily pivotable. This is in distinct contrast to a conventional booster wherein a deep annular groove prevents the inner peripheral end of the diaphragm from rotating since the rear side of the groove is relatively long as shown in FIG. 1. Further, since the open end corner 1Bc of the annular groove 1Bb and the inner peripheral end 2Bc of the diaphragm 2B are arcuately formed, the inner peripheral end 2Bc can smoothly rotate to thus prevent the rear diaphragm from collapsing as in the case of the front diaphragm.

During the non-servo operation state of the booster during which the four chambers are filled with atmospheric pressure, when the input shaft 8 is displaced frontwardly, the pressure differential between the first negative pressure chamber 3A and the first atmospheric pressure chamber 4A becomes larger than that between the second negative pressure chamber 3B and the second atmospheric pressure chamber 4B. In this case, the front diaphragm 2A is subjected to a larger force than the rear diaphragm 2B. This phenomena is explained as follows.

When the input shaft 8 is displaced forwardly during the non-servo state with the four chambers at atmospheric pressure, the internal pressure in the negative pressure chambers 3A, 3B becomes larger than that of the atmospheric pressure chambers 4A, 4B, respectively. Actually, the pressure in the atmospheric pressure chambers 4A, 4B becomes negative. However, since atmospheric pressure is immediately supplied to the second atmospheric pressure chamber 4B because of the displacement of the input shaft 8, the reduced pressure within the chamber 4B returns to atmospheric pressure to thus reduce the pressure differential between the chambers 3B and 4B. On the other hand, atmospheric pressure is not immediately supplied to the first atmospheric pressure chamber 4A since the air must pass through passages 16, 15 and the hole 14. This time lag causes the pressure differential between the chambers 3A and 4A to be larger than that between the chambers 3B and 4B.

If the expected pressure differential between the second negative and atmospheric pressure chambers 3B and 4B is relatively small, the inner end 2Ac of the front diaphragm may be pivotably secured to the annular groove 1Ab while the inner end 2Bc of the rear diaphragm 2B is secured to a conventional annular groove without allowing it to be freely pivotable or rotatable. Further, if the pressure differential between the first diaphragm and atmospheric chambers 3A and 4A is not extremely large, the same rotational arrangement of the inner end of the rear diaphragm and the associated annular groove can be applied to the front diaphragm. Furthermore, communication holes functionally equivalent to those described can be formed in the rear power piston 1B or another appropriate position.

The foregoing embodiment has been described with reference to a tandem type power servo booster. However, it is apparent that the invention can be applied to a single type power servo booster having a single power piston and single diaphragm.

While the invention has been described in detail and with reference to specific embodiments thereof, it will be apparent to one skilled in the art that various changes and modifications can be made thereto without departing from the spirit of the invention.

What is claimed is:

1. A power servo booster comprising a shell, at least one power piston and at least one diaphragm operatively disposed within said shell, said piston and diaphragm cooperating to divide said shell into at least one negative pressure chamber and at least one atmospheric pressure chamber, a supporting plate coupled to one side of the piston, said supporting plate having an outer peripheral end portion extending substantially radially outwardly to define an annular groove with a surface of said piston, said diaphragm having a thickened inner peripheral end disposed in said groove and having an arcuate edge surface on the side thereof toward said surface of said piston, said outer peripheral end portion of said plate being inclined at an angle relative to the radial direction of said piston in a range from 10° to 45° whereby said inner peripheral end of said diaphragm can freely pivot in said annular groove so that said diaphragm is not caused to bend in the vicinity of said inner peripheral end during a vacuum pressure failure in order to prevent said diaphragm from folding and collapsing during said vacuum pressure failure and a communication hole disposed in said supporting plate to provide communication between said chambers upon pivoting of said inner peripheral end of said diaphragm in said annular groove.

2. A power servo booster comprising a shell, a partitioning plate dividing said shell into first and second volumes, a first piston and a first diaphragm dividing said first volume into a first negative pressure chamber and a first atmospheric pressure chamber, a second piston and a second diaphragm dividing said second volume into a second negative pressure chamber and a second atmospheric pressure chamber, a supporting plate coupled to a portion of said first piston and having an outer peripheral end portion forming a first annular groove with a surface of said first piston, said first diaphragm having a first thickened inner peripheral end disposed in said first groove and having an arcuate surface disposed adjacent said surface of said first piston, said outer peripheral end portion of said supporting plate being inclined at an angle with respect to the radial direction of said first piston at an angle in the range from 10° to 45°, a second annular groove formed at one surface of said second piston, said second diaphragm having a second thickened inner peripheral end disposed in said second groove and having an arcuately formed edge and a radial length greater than the depth of said groove, said first and second annular grooves each being formed relative to said first and second inner peripheral ends of said first and second diaphragms so as to allow said first and second inner peripheral ends of said first and second diaphragms to freely pivot in said first and second annular grooves so that said first and second diaphragms are not caused to bend in the vicinity of said first and second inner peripheral ends during a vacuum pressure failure thus preventing said first and second diaphragms from floding and collapsing upon a vacuum pressure failure and a communication hole disposed in said supporting plate for communicating said first negative pressure chamber with said first atmospheric pressure chamber upon pivotal movement of said first inner peripheral end of said first diaphragm in said first annular groove.

* * * * *